United States Patent
Li et al.

(10) Patent No.: US 8,553,418 B2
(45) Date of Patent: Oct. 8, 2013

(54) MOUNTING APPARATUS FOR POWER SUPPLY UNIT

(75) Inventors: Nai-Juan Li, Shenzhen (CN); Zhi-Ping Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 386 days.

(21) Appl. No.: 13/070,911

(22) Filed: Mar. 24, 2011

(65) Prior Publication Data

US 2012/0026655 A1    Feb. 2, 2012

(30) Foreign Application Priority Data

Aug. 2, 2010   (CN) .......................... 2010 1 0242444

(51) Int. Cl.
   *H05K 7/20*    (2006.01)
(52) U.S. Cl.
   USPC ....................... 361/725; 361/679.01; 361/724

(58) Field of Classification Search
   USPC ..................................................... 361/679.6
   See application file for complete search history.

(56) References Cited

U.S. PATENT DOCUMENTS

| | | | |
|---|---|---|---|
| 5,777,848 A * | 7/1998 | McAnally et al. | 361/725 |
| 7,088,587 B2 * | 8/2006 | Chen et al. | 361/724 |
| 8,199,499 B2 * | 6/2012 | Chen et al. | 361/679.6 |
| 8,456,810 B2 * | 6/2013 | Chen et al. | 361/679.01 |
| 2010/0149778 A1 * | 6/2010 | Yeh et al. | 361/809 |

* cited by examiner

*Primary Examiner* — Anthony Q Edwards
(74) *Attorney, Agent, or Firm* — Altis & Wispro Law Group, Inc.

(57) ABSTRACT

An assembly includes a power supply unit, a base, and an enclosure. The base includes a bottom plate. The enclosure includes a bottom panel. A flexible piece is connected to the bottom panel. The power supply unit is located on the bottom panel. The bottom panel is located on the bottom plate of the base. The flexible piece is located between the power supply unit and the bottom plate, and is elastically bent.

14 Claims, 5 Drawing Sheets

MOUNTING APPARATUS FOR POWER SUPPLY UNIT

BACKGROUND

1. Technical Field

The present disclosure relates to mounting apparatuses for power supply units, and particularly to a mounting apparatus for readily and securely attaching a power supply unit to an electronic device.

2. Description of Related Art

Low-voltage direct current power is required for electronic components in an electronic device, such as motherboards and hard disk drives in computers. A power supply unit is often mounted in an enclosure of the electronic device for converting alternating current to direct current and supplying the direct current to the electronic components. When the electronic device is in transportation, it may be dropped which may damage the electronic components, such as the power supply unit.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
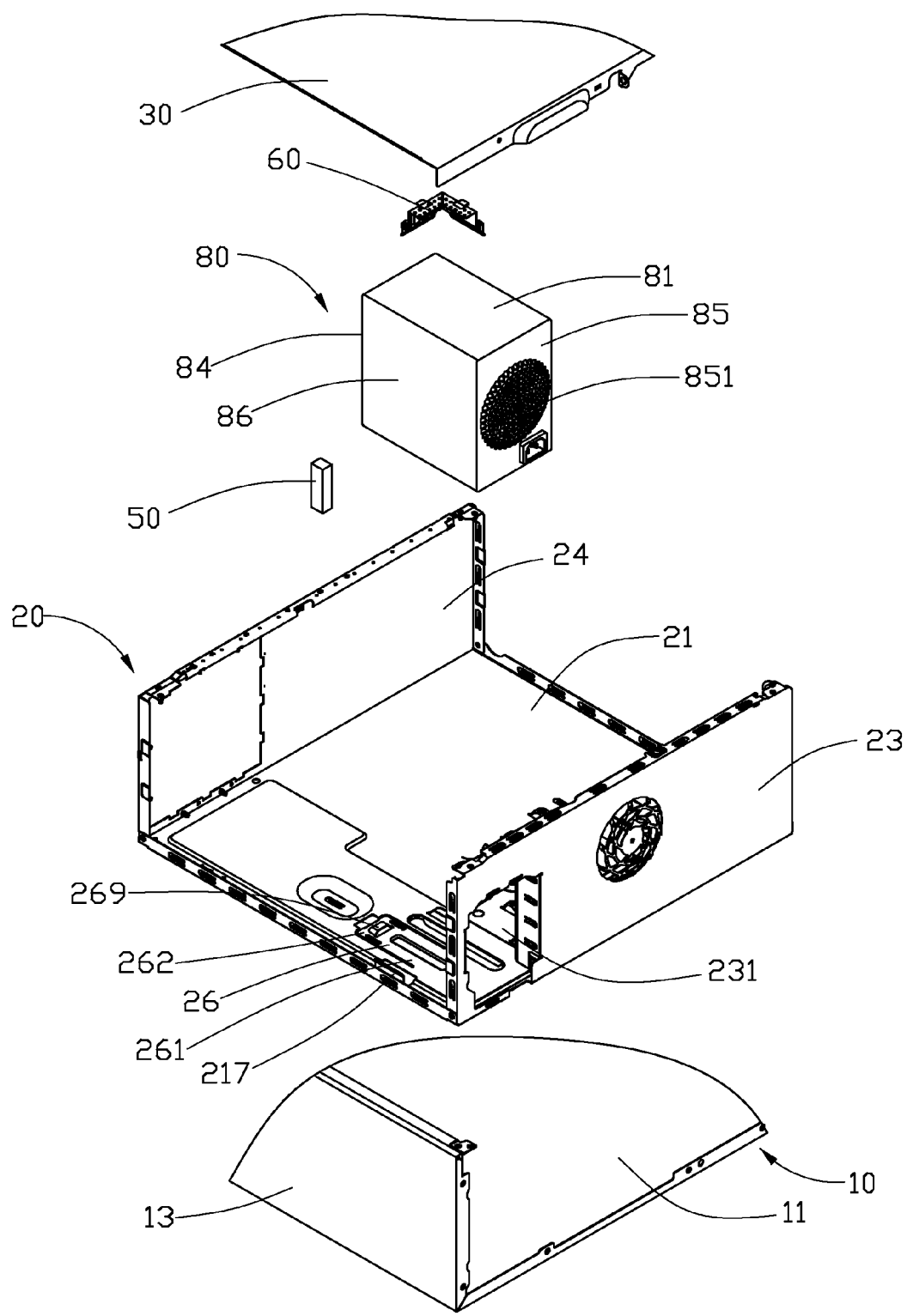
FIG. 1 is an isometric and exploded view of a mounting apparatus and a power supply unit in accordance with one embodiment.
Figure 2:
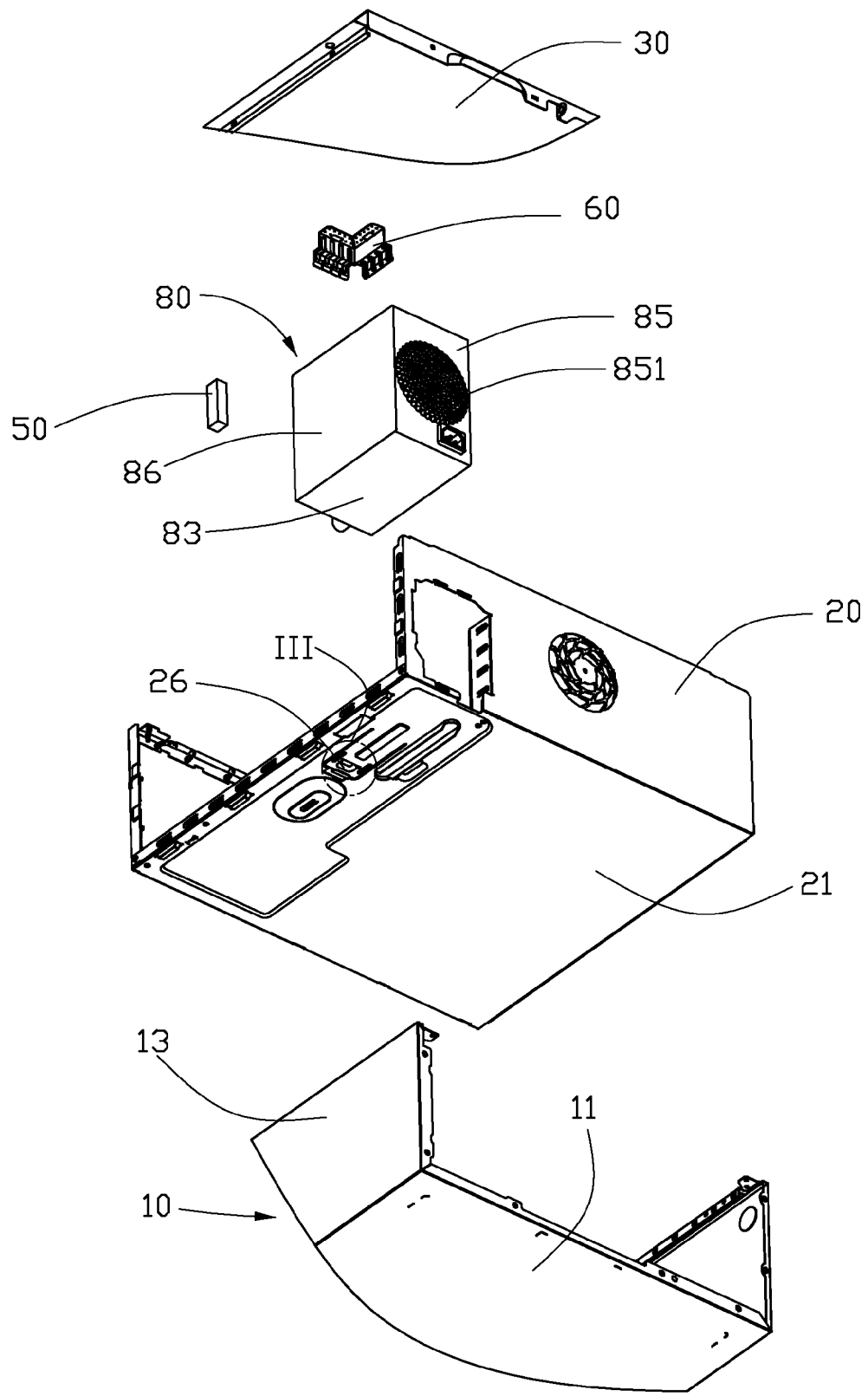
FIG. 2 is similar to FIG. 1, but viewed from another aspect.

Referring to FIGS. 1 and 2, a mounting apparatus in accordance with an embodiment for mounting a power supply unit 80 includes a base 10, an enclosure 20, a cover 30, an elastic block 50, and a damper 60. The power supply unit 80 includes a top wall 81, a bottom wall 83, a front wall 84, a rear wall 85, and two side walls 86. The rear wall 85 defines a plurality of vent holes 851.

The base 10 includes a bottom plate 11 and a pair of side plates 13. The pair of side plates 13 are perpendicularly connected to opposite edges of the bottom plate 11.

The enclosure 20 includes a bottom panel 21, a rear panel 23, and a front panel 24. The rear panel 23 is perpendicularly connected to a rear edge of the bottom panel 21. The front panel 24 is perpendicularly connected to a front edge of the bottom panel 21. The rear panel 23 defines an opening 231. A plurality of restricting pieces 217 is located on the bottom panel 21. A flexible piece 26 is located on the bottom panel 21. The flexible piece 26 is in alignment with the opening 231.

The flexible piece 26 includes a fixed end 261 and a free end 262. The fixed end 261 is attached to the bottom panel 21. The free end 262 can flex so that the flexible piece 26 is bent. The free end 262 includes a protrusion 269 located on a top surface of the free end 262. The protrusion 269 protrudes over a plane of the bottom panel 21.

Figure 3:
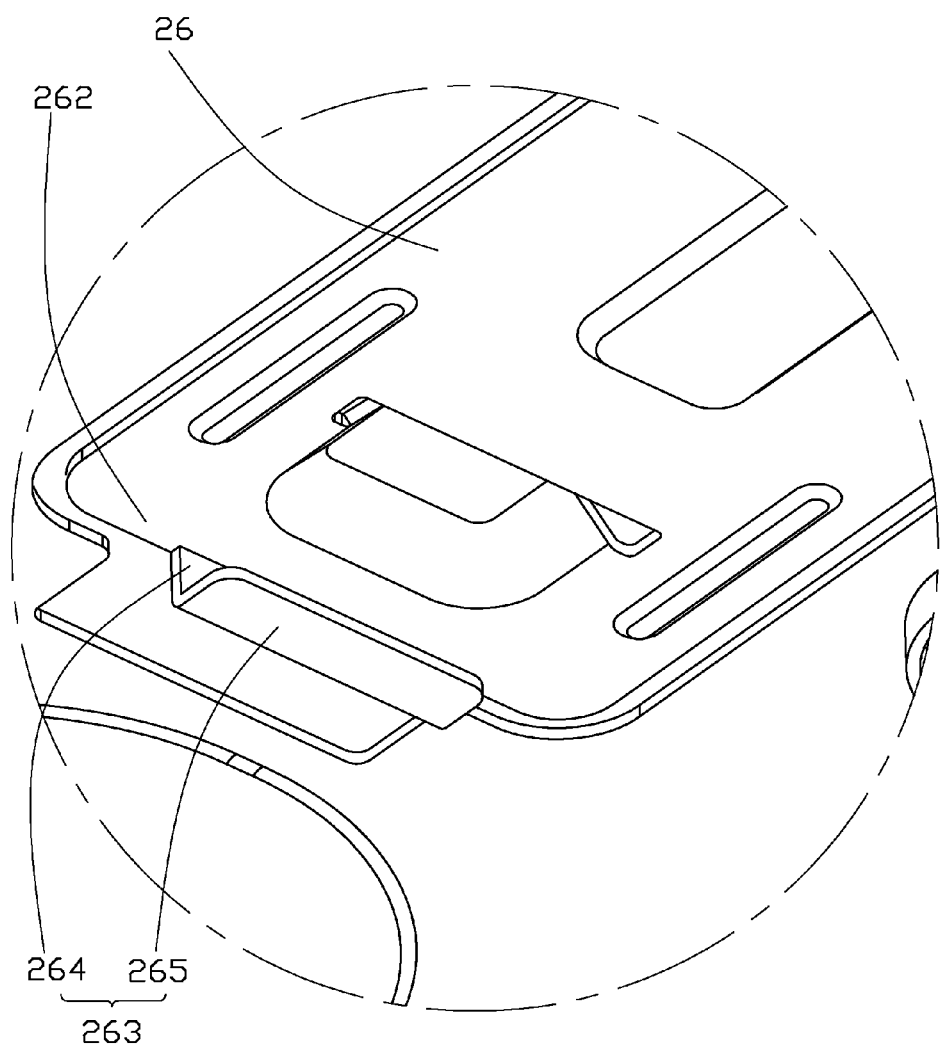
FIG. 3 is an enlarged view of the circle III of FIG. 2.

Referring to FIG. 3, a suspended piece 263 is connected to a bottom surface of the free end 262. The suspended piece 263 includes a connection portion 264 and a stand portion 265. The connection portion 264 is perpendicularly connected to the free end 262. The stand portion 265 is perpendicularly connected to a bottom end of the connection portion 264.

The elastic block 50 is made of elastic material, which can elastically deform.

Figure 4:
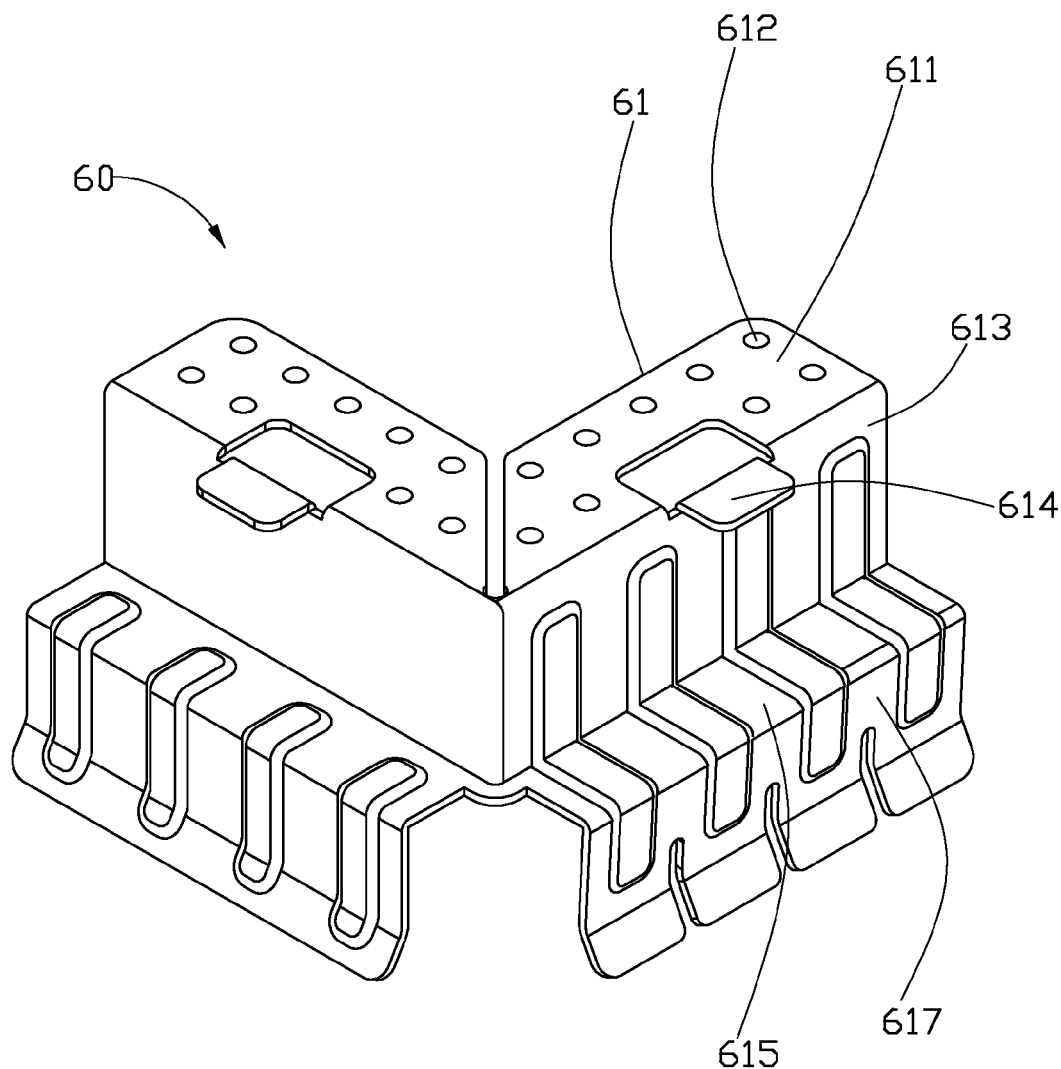
FIG. 4 is an isometric view of a damper of the mounting apparatus of FIG. 1.
Figure 5:
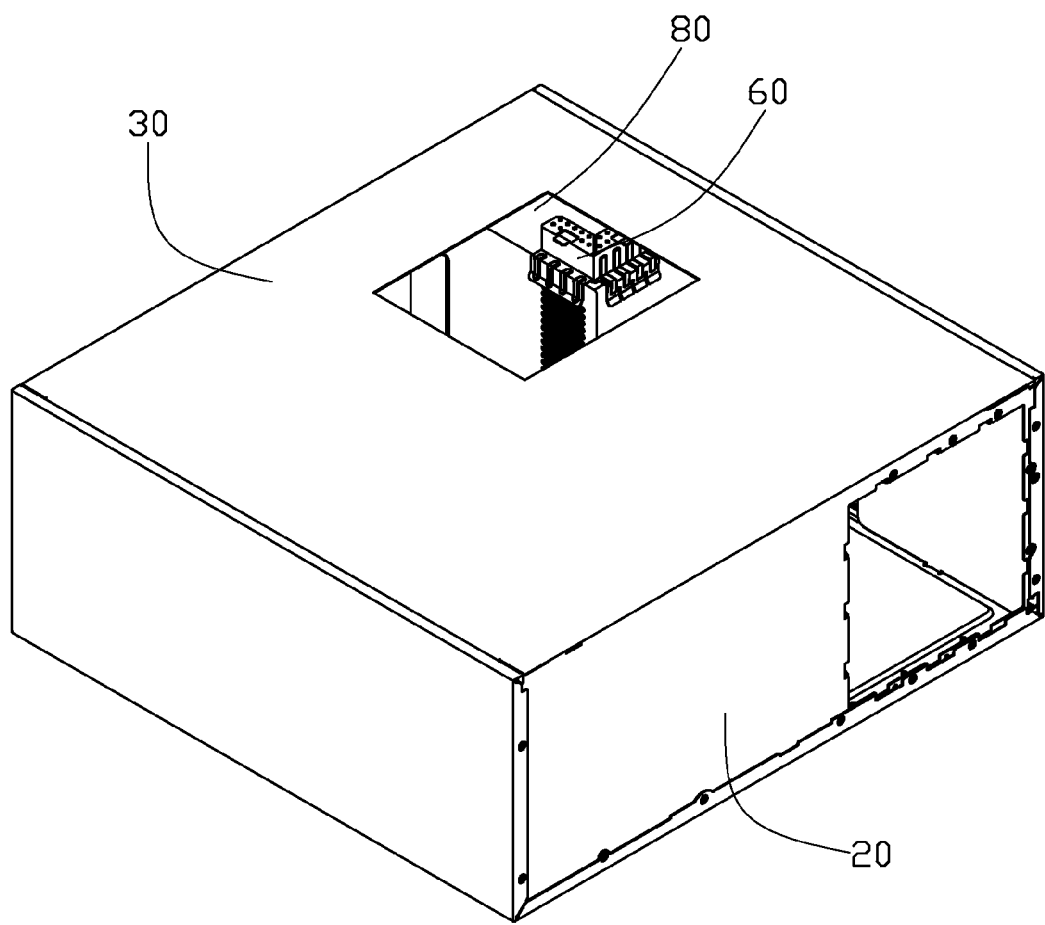
FIG. 5 is an isometric and assembled view of the mounting apparatus and power supply unit of FIG. 1.

Referring to FIG. 4, the damper 60 includes two step portions 61 connected with each other. Each step portion 61 includes a horizontal first support piece 611. A first connection piece 613 is perpendicularly connected to an edge of the first support piece 611. A second support piece 615 is perpendicularly connected to a bottom edge of the first connection piece 613. A second connection piece 617 is perpendicularly connected to an edge of the second support piece 615. The first support piece 611 and the second support piece 615 are substantially parallel with each other. The first connection piece 613 and the second connection piece 617 are substantially parallel with each other. A plurality of convex points 612 are located on the first support piece 611. A tab 614 is connected to a connection portion of the first support piece 611 and the first connection piece 613.

Referring to FIGS. 1 to 5, to fix the power supply unit 80, the power supply unit 80 is first placed on the bottom panel 21 of the enclosure 20. The restricting pieces 217 of the bottom panel 21 abut the side wall 86 of the power supply unit 80. The rear wall 85 of the power supply unit 80 is aligned with the opening 231 of the enclosure 20. The bottom wall 83 of the power supply unit 80 is located on the flexible piece 26 to press the protrusion 269 of the flexible piece 26. The flexible piece 26 is elastically bent. Then, the elastic block 50 is attached to a side wall 86, which faces outwards from the enclosure 20. The damper 60 is located on a corner of the top wall 81 of the power supply unit 80. The second support pieces 615 of the damper 60 are placed on the top wall 81. The second connection pieces 617 abut the front wall 84 and the side wall 86.

Then, the bottom panel 21 of the enclosure 20 is mounted on the bottom plate 11 of the base 10. The stand portion 265 is located on the bottom plate 11. The side plate 13 of the base 10 elastically squeezes the elastic block 50. At last, the cover 30 is mounted on the enclosure 20. The cover 30 is pressed on the convex points 612 of the damper 60. Therefore, the power supply unit 80 is fixed in the enclosure 20.

When the enclosure 20 is dropped, the damper 60, the elastic block 50, and the flexible piece 26 will elastically deformed to absorb shock. Thus, the power supply unit 80 is protected.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An assembly, comprising:
    a power supply unit;

a base comprising a bottom plate; and
an enclosure comprising a bottom panel, a flexible piece connected to the bottom panel, the power supply unit is located on the bottom panel, the bottom panel is located on the bottom plate of the base, and the flexible piece is located between the power supply unit and the bottom plate, and being elastically bent;
wherein the flexible piece comprises a free end and a fixed end, the fixed end is attached to the bottom panel; a first side of the free end comprises a protrusion that is pressed by the power supply unit, a second side of the free end comprises a suspended piece that abuts the bottom plate, the suspended piece comprises a connection portion and a stand portion, the connection portion is perpendicularly connected to the free end, and the stand portion is located on the bottom plate.

2. The assembly of claim 1, wherein the base comprises a side plate, an elastic block is attached to the power supply unit, and the side plate abuts and elastically deforms the elastic block.

3. The assembly of claim 1, further comprising a cover, wherein the cover is mounted to the enclosure, and the power supply unit is mounted between the cover and the bottom panel of the enclosure.

4. The assembly of claim 3, wherein a damper is located between the cover and the power supply unit.

5. The assembly of claim 4, wherein the damper comprises at least one step portion, the at least one step portion comprises a first support piece and a second support piece parallel to the first support piece, a first connection piece is connected between the first support piece and the second support piece, the first support piece abuts the cover, and the second support piece abuts the power supply unit.

6. The assembly of claim 5, wherein the first support piece comprises a plurality of convex points located thereon, the plurality of convex points is pressed by the cover.

7. The assembly of claim 5, wherein the at least one step portion comprises two step portions perpendicularly connected with each other, the two step portions are located on a corner of the a top wall of the power supply unit.

8. The assembly of claim 1, wherein the bottom panel comprises a plurality of restricting pieces, and the power supply unit is retained by the plurality of restricting pieces.

9. An assembly, comprising:
a power supply unit;
an enclosure comprising a bottom panel, the power supply unit located on the bottom panel;
a cover mounted to the enclosure, the cover comprising a damper which is located between the cover and the power supply unit; and
a base, wherein the base comprises a bottom plate, a flexible piece is connected to the bottom panel of the enclosure, the bottom panel is located on the bottom plate of the base, the flexible piece is located between the power supply unit and the bottom plate, and is elastically bent, the flexible piece comprises a free end and a fixed end, the fixed end is attached to the bottom panel; a first side of the free end comprises a protrusion that is pressed by the power supply unit, a second side of the free end comprises a suspended piece that abuts the bottom plate, the suspended piece comprises a connection portion and a stand portion, the connection portion is perpendicularly connected to the free end, and the stand portion is located on the bottom plate.

10. The assembly of claim 9, wherein the damper comprises at least one step portion, the at least one step portion comprises a first support piece and a second support piece parallel to the first support piece, a first connection piece is connected between the first support piece and the second support piece, the first support piece abuts the cover, and the second support piece abuts the power supply unit.

11. The assembly of claim 10, wherein the first support piece comprises a plurality of convex points located thereon, the plurality of convex points is pressed by the cover.

12. The assembly of claim 10, wherein the at least one step portion comprises two step portions perpendicularly connected with each other, the two step portions are located on a corner of the a top wall of the power supply unit.

13. The assembly of claim 9, wherein the base comprises a side plate, an elastic block is attached to the power supply unit, and the side plate abuts and elastically deforms the elastic block.

14. The assembly of claim 9, wherein the bottom panel comprises a plurality of restricting piece, and the power supply unit is confined by the plurality of restricting pieces.

* * * * *